(12) United States Patent
Yang et al.

(10) Patent No.: US 9,293,750 B2
(45) Date of Patent: Mar. 22, 2016

(54) POROUS MEMBRANE AND METHOD FOR MANUFACTURING THE SAME

(71) Applicant: W-Scope Corporation, Kanagawa (JP)

(72) Inventors: Jae Won Yang, Chungbuk (KR); Si Ju Ryu, Chungbuk (KR); Seong Tae Kim, Chungbuk (KR); Byung Hyunn Kim, Chungbuk (KR); Jung Goo Park, Chungbuk (KR); Hee Min Cho, Chungbuk (KR)

(73) Assignee: W-Scope Corporation, Kanagawa (JP)

( * ) Notice: Subject to any disclaimer, the term of this patent is extended or adjusted under 35 U.S.C. 154(b) by 601 days.

(21) Appl. No.: 13/646,162

(22) Filed: Oct. 5, 2012

(65) Prior Publication Data

US 2013/0171499 A1    Jul. 4, 2013

(30) Foreign Application Priority Data

Apr. 5, 2011   (KR) .................. 10-2011-0031099
Jul. 13, 2011  (KR) .................. 10-2011-0069260
Oct. 6, 2011   (KR) .................. 10-2011-0101768

(51) Int. Cl.
| | |
|---|---|
| H01M 2/16 | (2006.01) |
| H01M 2/14 | (2006.01) |
| H01M 2/18 | (2006.01) |
| B01D 67/00 | (2006.01) |
| B01D 71/26 | (2006.01) |

(52) U.S. Cl.
CPC ........... *H01M 2/162* (2013.01); *B01D 67/0027* (2013.01); *B01D 67/0046* (2013.01); *B01D 67/0079* (2013.01); *B01D 71/26* (2013.01); *H01M 2/145* (2013.01); *H01M 2/1653* (2013.01); *H01M 2/18* (2013.01); *B01D 2323/18* (2013.01); *B01D 2323/21* (2013.01); *B01D 2325/02* (2013.01)

(58) Field of Classification Search
None
See application file for complete search history.

(56) References Cited

U.S. PATENT DOCUMENTS

2006/0103055 A1   5/2006  Hoshuyama et al.
2012/0094184 A1*  4/2012  Abe et al. .................. 429/251

FOREIGN PATENT DOCUMENTS

| | | |
|---|---|---|
| CN | 1694791 A | 11/2005 |
| EP | 2111914 A1 | 10/2009 |
| EP | 2169742 A1 | 3/2010 |
| JP | 2010-024463 A | 2/2010 |
| JP | 4460028 B2 | 5/2010 |
| KR | 10-0373204 B1 | 2/2003 |
| KR | 10-0577731 B1 | 5/2006 |
| KR | 10-0739337 B1 | 7/2007 |
| KR | 10-0754746 B1 | 9/2007 |
| KR | 10-0776029 B1 | 11/2007 |
| KR | 10-0858214 B1 | 9/2008 |
| KR | 2010-0028009 A | 3/2010 |
| KR | 10-0971109 B1 | 7/2010 |
| KR | 10-1029672 B1 | 4/2011 |
| KR | 2011-0035847 A | 4/2011 |
| WO | 99/48959 A1 | 9/1999 |
| WO | WO 2010/143677 | * 12/2010 |

OTHER PUBLICATIONS

European Office Action in corresponding European application No. 12,768,525.3 dated Apr. 22, 2015 (5 pages).
Extended European Search Report in corresponding European Application No. 12768525.3 dated Aug. 8, 2014 (10 pages).
International Search Report issued in PCT/JP2012/059256, mailed on Jun. 19, 2012 and translation thereof (5 pages).
Office Action in corresponding Chinese Application No. 201280003058.0, dated Jun. 9, 2014 (6 pages).
Office Action in corresponding Chinese Application No. 201280003058.0, dated Nov. 27, 2013 (6 pages).

* cited by examiner

*Primary Examiner* — Sarah A Slifka
(74) *Attorney, Agent, or Firm* — Nakanishi IP Associates, LLC

(57) ABSTRACT

A porous membrane contains a polyethylene resin, in a core layer, pores of sizes that are relatively larger than those of pores in each of skin layers on the opposite sides are distributed, and the skin layers on the opposite sides have substantially same pore characteristics. A method for manufacturing a porous membrane includes the steps of: obtaining a mixture of a liquid-type paraffin oil and a solid-type paraffin wax; adding the mixture to a polyethylene resin to obtain a raw material resin mixture; extruding and cooling the raw material resin mixture; stretching the raw material resin mixture; and immersing the stretched raw material resin mixture in an organic solvent to extract a mixture of the oil and the wax.

10 Claims, 2 Drawing Sheets

(A)　　　　　　　　(B)　　　　　　　　(C)

(A)　　　　　　　　(B)　　　　　　　　(C)

(A)　　　　　　　　(B)　　　　　　　　(C)

(A)  (B)  (C)

POROUS MEMBRANE AND METHOD FOR MANUFACTURING THE SAME

TECHNICAL FIELD

The present invention relates to a polyethylene resin-based porous membrane and a method for manufacturing the same.

BACKGROUND ART

Recently, with the rapid development of the industry related to portable electronic devices such as smart phones, there is a substantially increasing demand for lithium-ion batteries and lithium polymer batteries, which are representative secondary batteries. In particular, facing an age of high oil price, accompanying practical use of electric vehicles such as hybrid vehicles and plug-in vehicles, it can be expected that the demand for lithium secondary batteries will explosively increase in the future. Along with such industrial demand, there is a demand for reduction in weight and size and increase in capacity of lithium secondary batteries as new technical challenges.

Separators, which are main components that influence the performance of the secondary battery are inserted between anodes and cathodes, and function to prevent a short-circuit phenomenon in which the cathodes and the anodes are brought into contact with each other. Also, in each separator, infinitely numerous micro pores are formed and through the pores, ionic substances are transferred between the anode and the cathode and thereby charged and discharged repeatedly.

Such separators each mainly includes a polyolefin resin that is excellent in chemical stability and electrical characteristics, and the separators are different in performance, that is, mechanical strength and electrical performance, depending on the size, distribution proportion and orientation structure of the pores that serve as passages of ionic substances. Accordingly, various techniques for pore structures of separators have conventionally been developed.

For example, Korean Patent No. 373204 (registration date: Feb. 10, 2003) describes a multicomponent composite separator for a polyelectrolyte configured so as to include an active layer at each of surfaces on opposite sides thereof and a support layer inside thereof, and have a Gurley value of no more than 20,000 seconds/100 cc.

Also, Korean Patent No. 577731 (registration date: May 1, 2006) describes a microporous separator for a secondary battery in which a polyolefin resin is used as a main material, an amorphous layer having a fixed thickness is formed on each of surfaces on opposite sides thereof, a crystal layer is formed inside thereof, sizes of pores of the amorphous layer are no more than 1 μm, and sizes of pores of the inside crystal layer are no more than 5 μm and the entire porosity is no less than 50%.

Also, Korean Patent No. 776029 (registration date: Nov. 6, 2007) describes a polyolefin separator for a secondary battery in which at a cathode-side surface thereof, the distribution proportion of pores of sizes of 80 nm to 2 μm is 90 to 97% and the distribution proportion of pores of sizes of less than 80 nm is 3 to 10% and at an anode-side surface thereof, the distribution proportion of pores of sizes of 30 nm to 1 μm is 90 to 97% and the distribution proportion of pores of sizes of less than 30 nm is 3 to 10%.

CITATION LIST

Patent Literature

Patent Literature 1: Korean Patent No. 577731
Patent Literature 2: Korean Patent No. 776029

However, in a process of manufacturing a separator such as described above, a sheet extruded through a T-die is made to pass between a casting roll and a nip roll in order to cool the sheet, and at this time, since the casting roll and the nip roll have radiuses that are different from each other, the cooling effects of the aforementioned two rolls brought into contact with the respective surfaces on the opposite sides of the sheet are not the same.

As described above, the conventional separators have the problem that in the manufacturing process, a minute difference in cooling speed occurs between the skin layers on the opposite sides, which makes control of the pore characteristics, that is, the size and distribution, of the skin layers on the opposite sides, uneasy. Furthermore, where a raw material resin having a low molecular weight is used in order to enhance the porosity of a separator, the ion permeability rises and the electric performance is thereby enhanced, but the problem of a decrease in mechanical strength such as tensile strength occurs.

An object of the present invention is to provide a porous membrane that simultaneously achieves excellent electric performance and excellent mechanical strength, and has skin layers on the opposite sides thereof, the skin layers having same pore characteristics, and a method for manufacturing the same.

SUMMARY OF INVENTION

1. Porous membrane 1.1 First Porous Membrane

A porous membrane according to one or more embodiments of the present invention contains a polyethylene resin, fibers of the polyethylene resin being piled up in multiple layers, in which micro pores are formed so as to extend in a horizontal direction, and an average diameter ($\alpha 1$) of the micro pores at a horizontal surface of a core layer is larger than an average diameter ($\beta 1$) of the micro pores at a horizontal surface of a skin layer.

In one or more embodiments of the present invention, a ratio ($\alpha 1$)/($\beta 1$) of the average diameter ($\alpha 1$) to the average diameter ($\beta 1$) can be no less than 1.5.

1.2 Second Porous Membrane

A porous membrane according to the present invention contains a polyethylene resin, fibers of the polyethylene resin being piled up in multiple layers, in which micro pores are formed so as to extend in a horizontal direction, and an area proportion ($\alpha 2$) of an area occupied by the micro pores in a horizontal surface of a core layer is larger than an area proportion ($\beta 2$) of an area of the micro pores in a horizontal surface of a skin layer.

In one or more embodiments of the present invention, a ratio ($\alpha 2$)/($\beta 2$) of the area proportion ($\alpha 2$) to the area proportion ($\beta 2$) can be no less than 1.5.

In one or more embodiments of the present invention, it is possible that the porous membrane has a structure in which the respective micro pores extend in the horizontal direction and are oriented in multiple layers among porous base material fibers, and the porous membrane includes pores of sizes of 0.01 to 0.3 μm at a distribution proportion of 50 to 97% in the entire pores of a skin layer on each of opposite sides, and pores of sizes of 0.3 to 1 μm at a distribution proportion of 50 to 97% in the entire pores of the core layer.

In one or more embodiments of the present invention, the skin layers on the opposite sides can have a substantially same pore characteristic.

In one or more embodiments of the present invention, slurry containing an inorganic filler or an organic filler and an organic binder can be applied to one surface or both of opposite surfaces of the porous membrane.

In one or more embodiments of the present invention, the slurry can contain 0.1 to 30% by weight of a water-soluble polymer, 1 to 40% by weight of a non-water-soluble particulate polymer manufactured by emulsion polymerization or suspension polymerization, 1 to 50% by weight of the inorganic filler and 20 to 70% by weight of water.

In the present invention, the water-soluble polymer can be any one or more selected from methylcellulose, carboxymethylcellulose and salts thereof, and associated polyurethane and alkali-swellable acrylic resins.

In one or more embodiments of the present invention, the particulate polymer can be any one or more selected from an acrylic copolymer, a methacrylic copolymer, a (meth)acrylic-styrene copolymer, a (meth)acrylic-acrylonitrile copolymer, a silicon-acrylic copolymer, an epoxy-acrylic copolymer, polybutadiene, polyisoprene, a butadiene-styrene random copolymer, an isoprene-styrene random copolymer, an acrylonitrile-butadiene copolymer, an acrylonitrile-butadiene-styrene copolymer, a butadiene-styrene block copolymer and a styrene-butadiene-styrene-block copolymer.

In one or more embodiments of the present invention, the particulate polymer can have a particle size of 0.01 to 1 μm.

In one or more embodiments of the present invention, the inorganic filler can be any one or more selected from CaCO3, Al2O3, SiO2, BaTiO3, TiO2, Talc, Al(OH)3 and AlOOH, and having a diameter of 0.1 to 2 μm.

2. Porous Membrane Manufacturing Method

A porous membrane manufacturing method according to one or more embodiments of the present invention can include:

a process (A) of manufacturing a raw material resin mixture containing 10 to 90 parts by weight of a solid-type paraffin wax having a weight-average molecular weight of 100 to 5,000 and 10 to 90 parts by weight of a liquid-type paraffin oil having a weight-average molecular weight of 300 to 1,500 relative to 100 parts by weight of a polyethylene resin;

a process (B) of extruding and cooling the raw material resin mixture;

a process (C) of stretching the raw material resin mixture extruded in the process (B); and a process (D) of immersing the raw material resin mixture stretched in the process (C) in an organic solvent to extract the solid-type paraffin wax and the liquid-type paraffin oil.

In one or more embodiments of the present invention, the porous membrane manufacturing method can include a process (E) of applying slurry including an inorganic filler or an organic filler and an organic binder to one surface or both of opposite surfaces of the porous membrane after the process (D).

A porous membrane manufacturing method according to the present invention can include the steps of:

a) manufacturing a raw material resin mixture containing 10 to 90 parts by weight of a solid-type paraffin wax having a weight-average molecular weight of 100 to 5,000, 10 to 90 parts by weight of a liquid-type paraffin oil having a weight-average molecular weight of 300 to 1,500 as a pore-forming additive, and 6 to 10 parts by weight of an antioxidant relative to 100 parts by weight of a polyethylene resin having a melt index of 0.01 to 0.6 g/10 minutes and a weight-average molecular weight of no less than 300,000 and less than 500,000;

b) mixing the raw material resin mixture into an extrusion screw to melt the raw material resin mixture at a temperature of 180 to 250° C. and extrude a gelatinous sheet having a thickness of 1,000 to 6,000 μm, and making the gelatinous sheet pass between a casting roll and a nip roll, respective surface temperatures of which are adjusted to 30 to 60° C., to cool the gelatinous sheet, in which for the nip roll, a nip roll having a diameter (D1) of a center region thereof that is smaller than a diameter (D2) of each of end parts on opposite sides of the nip roll and including a surface having an arc-like inverse gradient formed in an axial direction is used;

c) sequentially stretching the cooled sheet in a machine direction and then in a transverse direction by approximately 5 to 15 times, respectively, to manufacture a stretched film having a thickness of 6 to 50 μm; and d) immersing the stretched film in an extraction solvent to remove the pore-forming additive, and then thermally fixing the stretched film at a temperature of 110 to 150° C.

In one or more embodiments of the present invention, an amount of use of the solid-type paraffin wax and the liquid-type paraffin oil can be 1:0.8 to 1.2.

In one or more embodiments of the present invention, for the nip roll, a nip roll having a length (L) in the axial direction of 800 to 1,000 mm, a radius (R) of an arc forming the inverse gradient at the surface thereof being 500,000 to 2,000,000 mm, can be used.

In one or more embodiments of the present invention, the raw material resin mixture can be obtained by mixing the solid-type paraffin wax and the liquid-type paraffin oil into the polyethylene resin in a state in which the solid-type paraffin wax and the liquid-type paraffin oil are previously mixed.

A porous membrane manufacturing method according to one or more embodiments of the present invention can include the steps of:

A) melting and mixing 10 to 90 parts by weight of a solid-type paraffin wax having a weight-average molecular weight of 100 to 5,000 and 10 to 90 parts by weight of a liquid-type paraffin oil having a weight-average molecular weight of 300 to 1,500 at a temperature of 80 to 100° C. to manufacture a paraffin wax mixture;

B) putting the paraffin wax mixture in a high-temperature state into an extrusion screw together with 100 parts by weight of a polyethylene resin having a weight-average molecular weight of no less than 300,000 and less than 500,000 to be melted and kneaded at a temperature of 180 to 250° C., and then extruding and cooling the resulting mixture to manufacture a gelatinous sheet, and biaxially stretching the gelatinous sheet and then immersing the gelatinous sheet in an organic solvent to manufacture a porous base material;

C) mixing 0.1 to 30% by weight of a water-soluble polymer and 1 to 40% by weight of a non-water-soluble particulate polymer manufactured by emulsion polymerization or suspension polymerization, 1 to 50% by weight of an inorganic filler and 20 to 70% by weight of water to manufacture aqueous-dispersion ceramic slurry; and D) applying the aqueous-dispersion ceramic slurry to one surface or both of opposite surfaces of the porous base material in a thickness of 1 to 5 μm to form a ceramic coating layer.

In one or more embodiments of the present invention, in order to cool the gelatinous sheet in the B) step, the gelatinous sheet is made to pass between a casting roll and a nip roll, respective surface temperatures of which are adjusted to 30 to 60° C., and a roll including an inverse gradient formed at an outer surface of the nip roll, a radius of a circle circumscribing the outer surface in a length direction is 500,000 to 2,000,000 mm, can be used.

In one or more embodiments of the present invention, the ceramic-coated porous membrane can have a thickness of 10 to 30 μm, a porosity of 30 to 50%, a Gurley value of 100 to 400 sec/100 ml, a tensile strength of 1,000 to 3,000 kgf/cm$^2$, and a thermal contractility of less than 5% in each of a machine direction and a transverse direction upon exposure at 150° C. for one hour.

DESCRIPTION OF EMBODIMENTS

One or more embodiments of the present invention will be described in detail below. However, the terms used to describe the present invention can be used as concepts specifically defined for the object of the present invention.

In the present embodiments, a porous membrane will be described taking a porous separator as an example.

1. First Embodiment

An example in which a porous membrane according to the present embodiment is employed as a porous membrane will be described. The porous membrane can include a polyethylene resin. Although an average molecular weight of the polyethylene resin is not specifically limited, it is preferable that the porous membrane include, for example, a polyethylene resin having a weight-average molecular weight of no less than 300,000 and less than 500,000. In this case, if a polyethylene resin having a weight-average molecular weight of less than 300,000 is used, the stretchablility of the porous membrane is enhanced, but the problem of a decrease in mechanical strength occurs, and meanwhile, if a polyethylene resin having a weight-average molecular weight of no less than 500,000 is used, the mechanical strength of the porous membrane is enhanced, but the problems of a decrease in stretchability and kneadability, resulting in a decrease in productivity, and uneasiness of control of the sizes of pores occur.

For reference, conventional separators for secondary batteries mainly use a polyolefin resin having a weight-average molecular weight of no less than 500,000, desirably no less than 1,000,000 in order to maintain a desirable mechanical strength although the productivity and the pore characteristics are poor.

Figure 1:
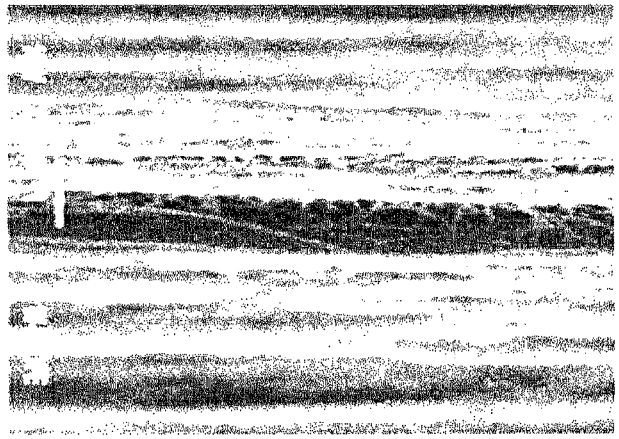
FIG. 1 is a scanning electron microscope photograph taken of a state of a cross-section of a porous membrane according to an example of the present invention.

The porous membrane is configured so that fibers of a polyethylene resin are piled up in multiple layers, micro pores are formed so as to extend in a horizontal direction, and an average diameter in the horizontal direction of the micro pores is larger in a center portion than in surface portions. More specifically, the porous membrane has a structure in which respective micro pores grew in the horizontal direction and oriented in multiple layers among fibers of a porous base material, and the porous membrane includes pores of sizes of 0.01 to 0.3 μm at a distribution proportion of 50 to 97% in the entire pores of a skin layer on each of opposite sides, and pores of sizes of 0.3 to 1 μm exist at a distribution proportion of 50 to 97% in the entire pores of a core layer. The porous membrane has a cross-sectional structure in which micro pores are oriented in multiple layers. The attached FIG. 1 is a scanning electron microscope (SEM) photograph taken of a state of a cross-section of a porous membrane according to an example of the present invention at a magnification of 20,000 times: it can be confirmed with naked eyes that micro fiber tissues are arranged side by side in the transverse direction of FIG. 1, and between the micro fiber tissues, numerous micro pores are oriented in layers, and in particular, pores arranged in the core layer (the intermediate region in FIG. 1) of the porous membrane are larger compared to pores arranged in the skin layers (the upper and lower end regions in FIG. 1) on the opposite sides of the porous membrane.

An average diameter ($\alpha 1$) of the micro pores at a horizontal surface of the core layer is larger than an average diameter ($\beta 1$) of micro pores at a horizontal surface of each of the skin layers, and more specifically, a ratio ($\alpha 1$)/($\beta 1$) of the average diameter ($\alpha 1$) to the average diameter ($\beta 1$) is no less than 1.5, preferably no less than 2.0, more preferably 2.0 to 5.0. A ratio ($\beta 1a$)/($\beta 1b$) of an average diameter ($\beta 1a$) in one of the skin layers to an average diameter ($\beta 1b$) in the other skin layer can be, for example, no more than 1.2, preferably 1.2 to 0.83, more preferably 1.1 to 0.9.

An area proportion ($\alpha 2$) of an area occupied by the micro pores in a horizontal surface of the core layer is larger than an area proportion ($\beta 2$) of an area of the micro pores in a horizontal surface of each of the skin layers, and a ratio ($\alpha 2$)/($\beta 2$) of the area proportion ($\alpha 2$) to the area proportion ($\beta 2$) is no less than 1.5, preferably no less than 2.0, more preferably 2.0 to 10.0. A ratio ($\beta 2a$)/($\beta 2b$) of an area proportion ($\beta 2a$) of an area of the micro pores in a horizontal surface of one of the skin layers to an area proportion ($\beta 2b$) of an area of the micro pores in a horizontal surface of the other skin layer is, for example, no more than 1.2, preferably 1.2 to 0.83, more preferably 1.1 to 0.9.

As a result of the porous membrane having the aforementioned structure of the pores oriented in the multiple layers, an excellent mechanical strength can be maintained while a polyethylene resin having a weight-average molecular weight that is much smaller than those of conventional separators is used, and open cells, which are directly related to air permeability, are formed at a high proportion. Here, the open cells refer to respective micro pores mutually connected in a direction of the thickness of the porous membrane, and through the respective open cells, ionic substances smoothly move between an anode and a cathode.

Meanwhile, FIGS. 2 to 5 include SEM photographs taken of each of skin layers on opposite sides and a core layer of a porous membrane manufactured according to an example of the present invention at a magnification of 20,000 times. The left photographs A are photographs each taken of a state of an upper surface of the respective porous membranes, and the right photographs C are photographs each taken of a state of a lower surface of the respective porous membranes, and the center photographs B are photographs each taken of a state of a core layer by peeling a skin layer from the porous membrane.

It can be seen from FIGS. 2 to 5 that small-size pores are distributed in the skin layers on the opposite sides of the porous membrane (photographs A and C) and relatively large pores are distributed in the core layer of the porous membrane (photograph B). As a result of taking a plurality of SEM photographs of a porous membrane according an example of the present invention by a method that is the same as above, measuring the sizes of pores distributed in each of the skin layers and the core layer and calculating the respective degrees of distribution, it was confirmed that a distribution proportion of the pores of sizes of 0.01 to 0.3 μm in the skin layers on the opposite sides is 50 to 97%, a distribution of pores of sizes of 0.3 to 1 μm in the core layer is 50 to 97%, and the skin layers on the opposite sides have the same sizes and distribution of pores.

Based on the aforementioned SEM photographs, it was confirmed that an average diameter ($\alpha 1$) of the micro pores at a horizontal surface of the core layer is larger than an average diameter ($\beta 1$) of the micro pores at a horizontal surface of each of the skin layers, and more specifically, a ratio ($\alpha 1$)/($\beta 1$) of the average diameter ($\alpha 1$) to the average diameter ($\beta 1$) is no less than 1.5. Also, it was confirmed that an area proportion ($\alpha 2$) of an area occupied by the micro pores in the horizontal surface of the core layer is larger than an area proportion ($\beta 2$) of an area of the micro pores in the horizontal surface of each of the skin layers, and the ratio ($\alpha 2$)/($\beta 2$) of the area proportion ($\alpha 2$) to the area proportion ($\beta 2$) is no less than 1.5.

Furthermore, it can be seen in the core layer of the porous membrane (photographs B), thick fiber bundles like leaf veins or strings are distributed, and it can be considered that the respective fiber bundles enlarge the sizes of the pores distributed in the core layer, enabling an excellent mechanical strength to be maintained while using a polyethylene resin having a weight-average molecular weight that is much smaller than those of conventional separators.

Figure 2:
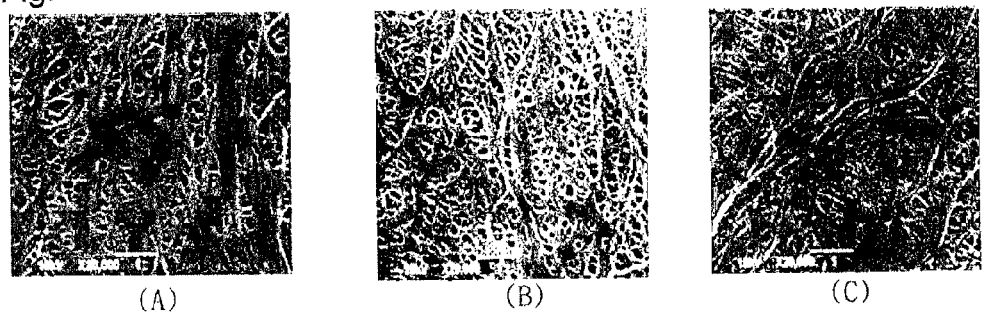
FIG. 2 is scanning electron microscope photographs taken of states of surfaces of skin layers (A and C) on opposite sides and a core layer (B) of a porous membrane according to an example of the present invention.

As a result of taking a plurality of scanning electron microscope (SEM) photographs of a state of a cross-section of a porous base material according to the present embodiment as in FIGS. 1 and 2, measuring actual sizes of pores distributed in each of skin layers and a core layer thereof and then determining a distribution chart thereof, it was confirmed that a distribution proportion of pores of sizes of 0.01 to 0.3 μm in each of the skin layers on the opposite sides is 50 to 97%, a distribution proportion of pores of sizes of 0.3 to 1 μm in the core layer is 50 to 97% and the skin layers on the opposite sides have the same sizes and distribution of pores.

Hereinafter, a method for manufacturing a porous membrane according to the present embodiment includes the processes of: A) of manufacturing a raw material resin mixture containing 10 to 90 parts by weight of a solid-type paraffin wax having a weight-average molecular weight of 100 to 5,000, preferably 100 to 1,000, and 10 to 90 parts by weight of a liquid-type paraffin oil having a weight-average molecular weight of 300 to 1,500, preferably 900 to 1,500, relative to 100 parts by weight of a polyethylene resin having, for example, a weight-average molecular weight of no less than 300,000 and less than 500,000; B) melting and extruding the raw material resin mixture; C) stretching the raw material resin mixture extruded in the (B) process; and D) immersing the raw material resin mixture stretched in the (C) process in an organic solvent to extract the solid-type paraffin wax and the liquid-type paraffin oil. Hereinafter, the respective processes will be described in detail.

A) Raw Material Resin Mixture Mixing Process

First, a raw material resin mixture containing, 10 to 90 parts by weight of a solid-type paraffin wax having a weight-average molecular weight of 100 to 5,000 as a pore-forming additive, a 10 to 90 parts by weight of a liquid-type paraffin oil having a weight-average molecular weight of 300 to 1,500, and 6 to 10 parts by weight of an antioxidant in 100 parts by weight of a polyethylene resin having a melt index of 0.01 to 0.6 g/10 minutes and, for example, a weight-average molecular weight of no less than 300,000 and less than 500,000 is manufactured.

More specifically, the raw material resin mixture is manufactured as follows.

A paraffin wax mixture is manufactured in advance by mixing and melting 10 to 90 parts by weight of a solid-type paraffin wax having a weight-average molecular weight of 100 to 5,000, preferably 100 to 1,000, and 10 to 90 parts by weight of a liquid-type paraffin oil having a weight-average molecular weight of 300 to 1500, preferably, 900 to 1,500, at a temperature of 80 to 100° C.

In other words, for the raw material resin mixture, first, a solid-type paraffin wax is heated and melt, and a liquid-type paraffin oil is mixed into the solid-type paraffin wax to manufacture a pore-forming additive. Consequently, the pore-forming additive is maintained in a gelatinous state, and it is desirable that such pore-forming additive in a gelatinous state be mixed to a polyethylene resin and an antioxidant. The mixture of the solid-type paraffin wax and the liquid-type paraffin oil is subsequently melt and kneaded and processed as a pore-forming additive together with the polyethylene resin and the processing additive, whereby the mixture functions to form a pore structure in which pores are oriented in multiple layers inside the porous base material afterward. As described above, use of a solid-type paraffin wax and a liquid-type paraffin oil together as a pore-forming additive enables a large increase in stretch ratio of subsequent sequential stretching of the resulting gelatinous sheet, as the stretch ratio is higher, the orientation and crystallization degrees of the molecules are raised, and thus, the physical strength of the porous base material is increased. Accordingly, the tensile strength and the puncture strength of the porous base material can be enhanced and furthermore, reduction in thickness of the porous membrane can be achieved.

Next, the mixture of the solid-type paraffin wax and the liquid-type paraffin oil, and a polyethylene resin and an antioxidant are mixed to manufacture a raw material resin mixture.

At this time, use of a polyethylene resin having a melt index of less than 0.01 g/10 minutes results in poor mixture with the pore-forming additive because of the low fluidity of the polyethylene resin, causing the problem of difficulty to obtain a sheet having a uniform thickness in a stretching process. Meanwhile, use of a polyethylene resin having a melt index of no less than 0.6 g/10 minutes may result in the resin running down in the sheet extrusion step because of the very high fluidity of the resin, causing the problem of a decrease in mechanical strength of the finished porous membrane.

Also, in the pore-forming additive, a ratio between the solid-type paraffin wax and the liquid-type paraffin oil may be a ratio of 1:0.8 to 1.2, desirably 1:1. If the amount of use of the solid-type paraffin wax and the amount of use of the liquid-type paraffin oil are each less than 10 parts by weight, the porosity of the porous membrane is decreased, which may result in poor charging performance of the resulting secondary battery, and meanwhile, if the amount of use of the solid-type paraffin wax and the amount of use of the liquid-type paraffin oil are each no less than 90 parts by weight, phase separation occurs between the polyethylene resin and the pore-forming additive during the sheet extrusion process, which may result in occurrence of breakage of the sheet.

For the paraffin oils, it is desirable to use waxes. The solid-type paraffin wax can be obtained by wax extracted and separated from an oil such as, in particular, light oil being subjected to solvent deoiling, chemical treatment and clay treatment. The liquid-type paraffin oil can be obtained by a liquid oil extracted and separated from an oil such as light oil being subjected to refining, dewatering and deodorization.

For the antioxidant, an ordinary antioxidant can be used, and in particular, a phosphate additive, for example, phosphite ester can be used.

In the present embodiment, various types of additives such as ultraviolet absorbers, antiblocking agents, pigments, colorants and inorganic fillers other than the antioxidant can be added as necessary.

B) Raw Material Resin Mixture Extrusion and Cooling Process

Next, the raw material resin mixture is mixed into an extrusion screw, and melt at a temperature of 180 to 250° C. and sufficiently mixed, and the raw material resin mixture is then extruded through a T-die to manufacture a gelatinous sheet having a thickness of 1,000 to 6,000 μm.

Subsequently, the gelatinous sheet is made to pass between a casting roll and a nip roll, respective surface temperatures of which are adjusted to 30 to 60° C. Consequently, skin layers of the sheet that is brought into direct-contact with the casting roll and the nip roll are cooled and solidified relatively early, and a core layer of the sheet is cooled and solidified slowly compared to the skin layers of the sheet. At this time, in the skin layers where the pore-forming additive is cooled and solidified early together with the polyethylene resin, particles each having a relatively-small volume are formed, and in the core layer where the pore-forming additive is gradually cooled, particles each having a relatively-large volume are formed.

The casting roll may be made to have a radius that is around 1.4 to 1.6 times larger than the nip roll. In such case, when the gelatinous sheet is made to pass between the casting roll and the nip roll, the nip roll rotates considerably faster compared to the casting roll, and thus, the two rolls have different sheet cooling capabilities, and accordingly, the problem that the pore structures formed in the skin layers on the opposite side of the sheet are different from each other occurs.

Figure 6:
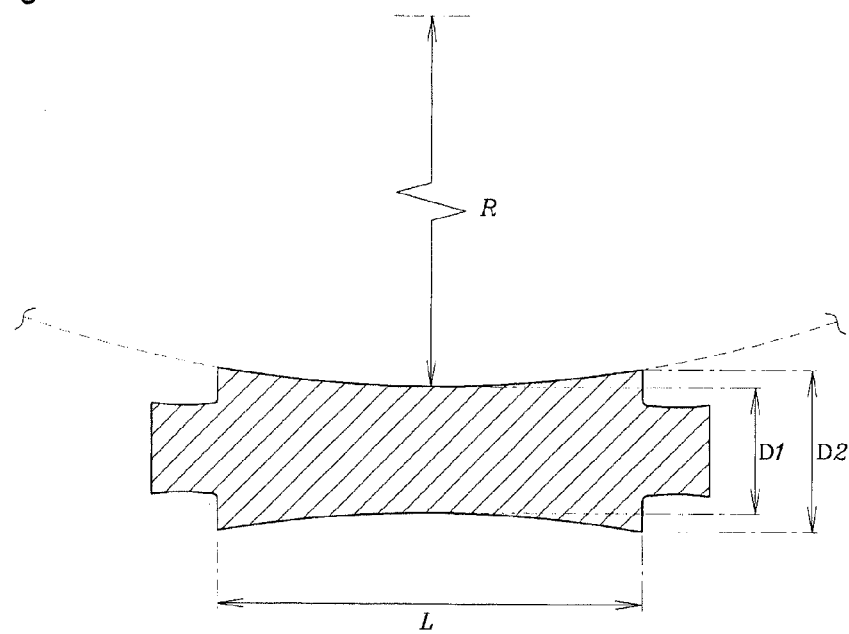
FIG. 6 is a diagram illustrating a structure of a nip roll used to cool a gelatinous sheet.

In order to solve such problem, a nip roll with the "inverse gradient" formed in an axial direction thereof is used. Here, "inverse gradient" refers to a shape in which a diameter (D1) of a center region of the nip roll is smaller than a diameter (D2) of each of opposite end parts of a nip roll, whereby an outline of the nip roll has an arc shape as illustrated in FIG. 6. Here, it is desirable that the nip roll have a length (L) in the axial direction of 800 to 1,000 mm, and the arc forming the inverse gradient, that is, a radius (R) of a circle circumscribing the nip roll in the axial direction (radius of a circle circumscribing an outer surface of the nip roll in a length direction) be 500,000 to 2,000,000 mm. For reference, in FIG. 6, for ease of understanding, the radius (R) of the arc is indicated so as to be relatively smaller compared to the length (L) of the nip roll; however, it should be understood that the radius (R) is much larger in reality.

As described above, where an inverse gradient is formed at the surface of the nip roll, the surface area of the nip roll is increased by that amount, and thus, even if the nip roll has a high rotation speed compared to that of the casting roll, the nip roll has a cooling capability that is the same as that of the casting roll. If the radius (R) of the arc forming the inverse gradient is less than 500,000 mm, the difference between the diameter (D1) of the center region and the diameter (D2) of each of the opposite end portions is too large, causing the problem of an excessively large difference in thickness between the center region and each of the opposite end part of the sheet, and if the radius (R) is no less than 2,000,000 mm, the problem of insufficiency in cooling effect of the nip roll occurs.

Meanwhile, if the surface temperatures of the casting roll and the nip roll are less than 30° C., the pore-forming additive sticks to the roll surfaces while being rapidly cooled, resulting in occurrence of irregularities of the surfaces of the gelatinous sheet or a failure to obtain a sheet having a uniform thickness. Conversely, if the surface temperatures are no less than 60° C., the pore-forming additive is not solidified, making formation of pores difficult, and the liquid-type paraffin oil adheres to the casting roll surface, causing slippage between the sheet and the rolls, resulting in occurrence of the problem of a failure to stretch the sheet at a predetermined ratio.

C) Sheet Stretching Process

Next, the cooled sheet is sequentially stretched in a machine direction and then in a transverse direction by approximately 5 to 15 times, respectively, to manufacture a film having a thickness of 6 to 50 μm. In other words, the sheet is first stretched in the machine direction by 5 to 15 times, and then stretched again in the transverse direction by 5 to 15 times. Consequently, the difference in thickness occurring due to the inverse gradient of the nip roll is eliminated, making the film has an entirely-uniform thickness distribution as well as having a multilayer orientation structure in which the respective pore-forming additives distributed in the skin layers and the core layer are arranged in layers.

In general, during manufacture of a porous membrane, uniaxial stretching in which the membrane is stretched in only one of a machine direction and a transverse direction is performed or simultaneous biaxial stretching in which the membrane is stretched in both of the directions simultaneously. However, in the case of the uniaxial stretching, a sheet must be stretched only in a direction in which the machine ejects the sheet, that is, only in a machine direction, resulting in a decrease in productivity. Meanwhile, in the case of simultaneous biaxial stretching, the stretching force imposed on the sheet is reduced, and thus, there is the problem of difficulty in high-speed and wide stretching.

However, in the present embodiment, sequential biaxial stretching in which stretching is performed in a machine direction and then in a transverse direction, providing excellent productivity and enabling stretching at a high-stretch ratio, and the resulting porous membrane includes micro pores formed in a multilayered structure inside thereof, and thereby has an excellent mechanical strength.

D) Pore-Forming Additive Extraction Process

Lastly, the stretched sheet is immersed in an extraction solvent to remove the pore-forming additive, thereby micro pores being formed, and is thermally-fixed in a thermal fixation chamber at 110 to 150° C. to remove residual stress. At this time, examples of usable organic solvents include, e.g., hydrocarbons such as pentane, hexane, heptane, chlorinated hydrocarbons such as methylene chloride and carbon tetrachloride, fluorohydrocarbons, and ethers such as diethyl ether and dioxane.

If the thermal fixation temperature is less than 110° C., the problem of a decrease in thermal resistance of the porous membrane occurs, and meanwhile, if the thermal fixation temperature is no less than 150° C., problems such as breakage of the porous membrane may occur.

A porous membrane according to the present embodiment can be widely utilized as a separator for an electronic component such as a lithium-ion capacitor or a lithium-ion cover sheet other than a separator for a secondary battery.

Compared to conventional porous membranes, a porous membrane according to the present invention has the characteristics of high mechanical strength as well as low electrical resistance and having excellent electric performance under same conditions.

Accordingly, such porous membrane can be expected to largely contribute to reduction in weight and size and increase in capacity of secondary batteries such as lithium-ion batteries and lithium polymer batteries.

Furthermore, use of both solid-type paraffin wax and liquid-type paraffin oil enables the stretch ratio to be increased, and as a result, reduction in thickness can be achieved while the excellent strength is achieved.

2. Second Embodiment

A porous membrane according to a second embodiment is one obtained by applying aqueous dispersion-type ceramic slurry to a porous membrane according to the first embodiment. The aqueous dispersion-type ceramic slurry according to the present embodiment includes 0.1 to 30% by weight of a water-soluble polymer, 1 to 40% by weight of a non-water-soluble particulate polymer, 1 to 50% by weight of an inorganic filler and 20 to 70% by weight of water. In the ceramic slurry, a part of the water-soluble polymer used as an organic binder adsorbs onto a surface of the inorganic filler, and a remaining part of the same exists in such a manner that the remaining part is dispersed in the water, whereby all of the components including the inorganic filler are stably maintained in an emulsion state.

Accordingly, if the content of the water-soluble polymer is less than 0.1% by weight, the amount of the water-soluble polymer adsorbing onto the surface of the inorganic filler decreases, making the maintenance of the entire uniform dispensability difficult, which may result in a failure to form a uniform ceramic coating layer. Meanwhile, if the content of the water-soluble polymer exceeds 30% by weight, the velocity of the aqueous-dispersion ceramic slurry becomes too high, which may result in the respective particles of the inorganic filler adsorbing onto one another, causing cross-linking aggregation, and in such case, the smoothness of the coating surface of the coating layer is lowered, making it difficult to obtain a uniform ceramic coating layer.

For the water-soluble polymer, one or more selected from methylcellulose, carboxymethylcellulose and salts thereof can be used as an ionic cellulose semisynthetic polymer, and one or more selected from associated polyurethane and alkali-swellable acrylic resins can be used as a synthetic polymer.

Next, the non-water-soluble particulate polymer is manufactured by emulsion polymerization or suspension polymerization as an organic binder in which a particulate polymer containing one or more hydrophilic groups selected from a group of a carboxyl group, a hydroxyl group and a sulfonate group is uniformly dispersed in water. As a result of containing the hydrophilic group(s), the particulate polymer has a function that enhances the dispersion stability of the inorganic filler and the bonding of the coating layer to the inorganic filler and a porous base material.

In the present embodiment, if the content of the non-water-soluble particulate polymer is less than 1% by weight, the particulate polymer cannot effectively exert the aforementioned function, and meanwhile, if the content of the non-water-soluble particulate polymer exceeds 40% by weight, the porousness of the ceramic coating layer is decreased and the performance of the secondary battery may be thereby decreased. For the particulate polymer, one or more selected from an acrylic copolymer, a methacrylic copolymer, a (meth)acrylic-styrene copolymer, a (meth)acrylic-acrylonitrile copolymer, a silicon-acrylic copolymer, an epoxy-acrylic copolymer, polybutadiene, polyisoprene, a butadiene-styrene random copolymer, an isoprene-styrene random copolymer, an acrylonitrile-butadiene copolymer, an acrylonitrile-butadiene-styrene copolymer, a butadiene-styrene block copolymer and a styrene-butadiene-styrene-block copolymer can be used.

It is desirable that the particulate polymer have a particle size of 0.01 to 1.0 μm. If the particle size is no more than 0.01 μm, the porousness is lowered and the resistance of the ceramic coating layer is increased, which may result in a decrease in performance of the battery, and meanwhile, if the particle size is no less than 1.0 μm, the number of contact points between the particulate polymer and the inorganic filler is decreased, causing the problem of a decrease in bonding force between the respective particles of the inorganic filler or between the inorganic filler and the coating layer.

Next, the inorganic filler functions to improve the thermal stability of the ceramic-coated porous membrane, and if the content thereof is less than 1% by weight, no effective thermal stability can be expected, and meanwhile, if the content thereof is no less than 50% by weight, precipitation of the inorganic filler may occur inside the ceramic slurry, making it difficult to obtain not only sufficient dispersion stability but also a uniform coating layer upon application. Here, the inorganic filler suppresses aggregation of inorganic particles to optimize the fluidity of the ceramic slurry, and thus, it is desirable that a measured value of the BET specific surface area be 1.5 to 150 m$^2$/g and it is desirable that the particle diameter (volume-average D50 average particle diameter) be 0.1 to 2 μm. Here, if the particle diameter of the inorganic fillers is less than 0.1 μm, no coating layer having uniform distribution can be formed because of poor dispersibility, and meanwhile, if the particle diameter exceeds 2 μm, short-circuiting of the battery may be induced because of excessively good air permeability.

For the inorganic filler, one or more selected from $CaCO_3$, $Al_2O_3$, $SiO_2$, $BaTiO_3$, $TiO_2$, Talc, $Al(OH)_3$ and AlOOH can be used, and for such inorganic filler, it is important that the dispersion stability is excellent and when the ceramic slurry is prepared, no sedimentation occurs and a uniform slurry state can be maintained over a long period of time. As a result of the present inventors testing various kinds of inorganic substances, aluminum oxide ($Al_2O_3$) from among the aforementioned inorganic fillers exhibited an optimum result for achieving the object of the present invention.

Next, the water functions as a dispersion medium that allows uniform dispersion of the water-soluble polymer and the non-water-soluble particulate polymer and the inorganic filler, and if the content of the water is less than 20% by weight, no sufficient aqueous dispersion of the respective components can be performed, making the application work difficult, causing the problem of a failure to form a uniform coating layer. Meanwhile, the content of the water is no less than 70% by weight, a problem may occur in the drying process after application of the ceramic slurry.

The ceramic slurry according to the present embodiment can contain any additive such as a dispersant, a viscosity modifier, a leveling agent, an antioxidant, a bonding agent, an additive having a function such as electrolyte decomposition suppression, as necessary, in addition to the water-soluble polymer and the non-water-soluble particulate polymer, and the inorganic filler and the water.

Meanwhile, a method for manufacturing a microporous ceramic-coated porous membrane according to the present embodiment includes a process of manufacturing a porous base material, a process of manufacturing aqueous-dispersion ceramic slurry, and a process of forming a ceramic coating layer. For the process of manufacturing a porous base material, the manufacturing process described in the first embodiment can be employed.

Since for the process of manufacturing a porous base material, the process described in the first embodiment can be employed, a detailed description thereof will be omitted.

In the process of manufacturing aqueous-dispersion ceramic slurry, respective components, that is, 0.1 to 30% by weight of a water-soluble polymer, 1 to 40% by weight of a non-water-soluble particulate polymer, 1 to 50% by weight of an inorganic filler and 20 to 70% by weight of water and an adequate amount of another additive added as necessary are mixed, for example, sufficiently mixed at 40° C. for around 12 hours using ball milling to manufacture aqueous-dispersion ceramic slurry.

Lastly, for a method for applying the ceramic slurry to a porous base material to form a ceramic coating layer thereon, an ordinary application method can be used. For example, any of various methods such as dip coating, die coating, gravure coating, comma coating and a method of combination of any of these can be used. From among these, in order to obtain a uniformly-coated surface, dip coating or gravure coating is desirable. Also, examples of a dying method after the application can include drying using warm air, hot air and low-humidity air, vacuum drying or drying using irradiation with, e.g., far-infrared ray or electron ray, but hot-drying in a temperature range of 80 to 120° C. is desirable.

It is desirable that the ceramic coating layer have a thickness of 1 to 5 µm. If the thickness is less than 1 µm, the problem of a large increase in thermal contractility of the porous membrane occurs, and if the thickness exceeds 5 µm, the porous membrane becomes too thick, causing problems in assembling of the lithium secondary battery or difficulty in downsizing of the battery. Furthermore, the ceramic coating layer can be applied to only one surface of the porous thin-membrane base material or can also be applied both of opposite surfaces thereof; however, double-side coating is more effective for enhancement of the thermal stability of the porous membrane than one-side coating.

According to the present embodiment, at the time of a drying step conducted after application of ceramic slurry, in the drying process, phase separation occurs between water, which is a dispersion medium, and other components and simultaneously, the inorganic filler, the water-soluble polymer and the particulate polymer are bound to one another to form nanosized aggregates. In the ceramic coating layer according to the present embodiment, micro voids are formed among the respective aggregates, and a microporous structure is formed while the water is vaporized and dried through the micro voids, and in particular, a proportion of open cells is increased, enabling provision of excellent air permeability.

On the other hand, in the case of a ceramic coating layer using conventional organic/inorganic coating solutions, pores are formed in the drying process using phase inversion of solvent/non-solvent, for example, acetone/moisture. However, in such pore formation mechanism using phase inversion, adjustment of the sizes of the pores is difficult, and even if pores are formed, the inner passages are often occluded, and thus, it is difficult to provide smooth air permeation.

A microporous ceramic porous membrane according to the present embodiment, which is manufactured by the aforementioned method, can have, for example, a thickness of 10 to 30 µm, and a porosity of 30 to 50%, an air permeability of 100 to 400 sec/100 ml, a tensile strength of 1,000 to 3,000 kgf/cm$^2$, and a thermal contractility of less than 5% in each of a machine direction and a transverse direction upon exposure at 150° C. for one hour.

The microporous ceramic porous membrane can be employed for, for example, a portable secondary battery for, e.g., a mobile phone or a laptop personal computer, a large-volume secondary battery for an electric automobile, a super secondary battery, and a lithium-ion capacitor.

Operation and effects of the second embodiment will be described below.

Widely-used conventional polyolefin porous membranes are poor in thermal stability for high temperature and physical strength, and when such a conventional polyolefin porous membrane is subjected to exposure at a temperature of 150° C. for around one hour, the polyolefin porous membrane exhibits a thermal contractility of 50 to 90%, and thereby loses the function of the separator, and such a polyolefin porous membrane also has the problem that internal short-circuiting is highly likely to occur upon receipt of an impact from the outside. A technique generally employed recently to cover such shortcomings is ceramic coating.

For example, Korean Patent Registration No. 739337 (2007 Jul. 6), Korean Patent No. 754746 (2007 Aug. 27), Korean Patent No. 858214 (2008 Sep. 4), Korean Patent Laid-Open No. 2010-28009 (2010 Mar. 11) and Korean Patent Laid-Open No. 2011-35847 (2011 Apr. 6) each propose an organic/inorganic composite ceramic-coated separator obtained by applying a coating solution including inorganic particles and a polymer binder to at least one surface of a polyolefin porous base material to form a porous active layer. Each of the ceramic-coated separators described in the aforementioned related patents reportedly has a remarkably-improved thermal stability compared to ordinary separators including no ceramic coating layer. However, there are considerable technical problems remained in such conventional ceramic-coated separators with regard to air permeability, which is an extremely important factor for the performance of the separators.

In other words, in general, when a ceramic coating layer is applied to a surface of a porous base material, the thermal stability of the separator is enhanced, but the coating layer blocks pores formed in the porous base material, resulting in a decrease in air permeability of the separator, and in such case, ion transfer passages between an anode and a cathode are largely reduced, causing the problem of a large decrease in charging and discharging performance of the secondary battery.

Seeing Korean Patent Registration No. 1029672 (2011 Apr. 8) for reference, it is reported that while a numerical value indicating a Gurley value of a polyethylene separator including no ceramic coating layer is approximately 230 sec/100 ml, when a coating layer is applied to a surface thereof, the numerical value is increased to 380 to 415 sec/100 ml, which indicates a large decrease in air permeability. Also, Korean Patent Registration No. 971109 (2010 Jul. 13) reports that although a polyethylene separator including no coating layer has air permeability of around 322 sec/100 ml, after completion of double-side application, the necessary airflow time is increased to 420 to 470 sec/100 ml under same conditions. As described above, an increase in time indicating the Gurley value means that the air permeability is reduced, and such result means that the ceramic coating layer blocks the pores in the porous base material. Accordingly, there is a need for development of a porous coating separator whose air permeability is not decreased even after application of a ceramic coating layer.

Although a majority of organic/inorganic-composite coating solutions used in the conventional ceramic coating techniques use volatile organic substances (VOC) such as toluene, methylene chloride, chloroform, ethanol, acetone and N-methyl-2-pyrrolidone (NMP) as solvents, such volatile organic substances are well known to be extremely harmful to human bodies or recognized as environmental pollutants, and in particular, have the problem of adversely affecting the health of workers during the application and drying process.

Meanwhile, in the secondary battery product market, an increase in output and a decrease in manufacturing cost of batteries are big issues. In order to respond to such demands in the market, it is necessary to develop a porous membrane with a thickness smaller than those of existing porous films and a heat resistance and physical properties improved compared to those of the existing porous membranes.

According to the present embodiment, a macroporous ceramic-coated porous membrane with excellent thermal stability and physical strength, a small thickness and providing almost no adverse effect of reduction in air permeability due to a ceramic coating layer can be provided. Accordingly, a ceramic-coated separator having a further decreased thickness compared to those of conventional porous membranes under same conditions can be manufactured, and thus, can contribute to capacity increase, size reduction and output increase of future secondary batteries, and furthermore, is expected to be widely used also for middle or large-size secondary batteries such as electric vehicles and fuel batteries.

Also, according to the present embodiment, a microporous ceramic-coated porous membrane that has no possibility of discharging environmental pollutants during the manufacturing process and also provides an environment-friendly work space and has no harm to the health of workers can be manufactured. Also, aqueous-dispersion ceramic slurry used in the present invention uses water as a dispersion medium without using volatile organic substances harmful to human bodies and thus, generates no environmental pollutants in the application and dry process, providing the effects of provision of an environment-friendly working surroundings and no possibility of damage of workers' health.

Although the present embodiment indicates an example in which a ceramic coating layer is used as a coating layer, a coating layer may be formed from slurry containing an organic filler and an organic binder.

For the organic filler, e.g., particles including any of various types of polymers such as polystyrene, polyethylene, polyimide, melamine resins, phenol resins and acrylic resins such as polymethylmethacrylate are used. The polymer included in the particles can be used even if the polymer is, e.g., a mixture, a modified substance, a derivative, a random copolymer, an alternate copolymer, a graft copolymer, a block copolymer or a cross-linked substance. There is no problem if the particles include two or more types of polymers.

Also, in the two embodiments described above, heat-resistant particles may exist inside the membrane including a polyethylene resin. For the heat-resistant particles, for example, the inorganic filler or the organic filler described above can be employed. The heat-resistant particles can be added before the raw material resin mixture extrusion process.

Examples of the present invention will be described below. However, the scope of right for the present invention is not limited by these Examples.

Example 1

1. Examples of First Porous Membrane

Example 1-1

A pore-forming additive was manufactured by mixing 9.9 kg of a solid-type wax having a weight-average molecular weight of 3746 and 9.9 kg of a liquid-type wax having a weight-average molecular weight of 1304, and 12.3 kg of a polyethylene resin having a melt index of 0.4 to 0.5 g/10 minutes and having a weight-average molecular weight (MW) of 380,000 and 1.0 kg of phosphite ester as an antioxidant were added to the pore-forming additive to manufacture a raw material resin mixture.

The raw material resin mixture was put into an extrusion screw, and extruded through a T-die at a temperature of 200° C. with a rotation speed of the screw maintained at 400 rpm to form a gelatinous sheet having a thickness of 1,800 µm.

The gelatinous sheet was cooled while being made to pass between a casting roll and a nip roll, respective surface temperature of which were maintained at 40° C. At this time, for the casting roll and the nip roll, a casting roll and a nip roll, a radius ratio of which is 1.5:1.0, were used, and for the nip roll, a nip roll having a length of 900 mm, a radius (R) of an arc forming an inverse gradient in an axial direction at a surface thereof being 1,700,000 mm, was used.

The sheet was first stretched by 7 times in a machine direction and then stretched by 10 times in a transverse direction in a lab stretching machine, and the stretched sheet was immersed in a methylene chloride solution to elute and remove the pore-forming additive.

Lastly, the stretched sheet was thermally fixed for four minutes in a heat chamber having a temperature of 130° C. to manufacture a polyethylene porous membrane having a thickness of 10.1 µm.

Example 1-2

A method that is the same as that of Example 1 above except that the rotation speed of the extrusion screw was maintained at 376 rpm and the thickness of the gelatinous sheet was made to be 2800 µam in Example 1-1 above was performed to manufacture a polyethylene porous membrane having a thickness of 16.2 µm.

Example 1-3

A method that is the same as that of Example 1 above except that the rotation speed of the extrusion screw was maintained at 360 rpm and the thickness of the gelatinous sheet was made to be 3400 µm in Example 1-1 above was performed to manufacture a polyethylene porous membrane having a thickness of 19.9 µm.

[Pore Property Findings]

A photograph of a state of a cross-section of the porous membrane manufactured by Example 1-1 above was taken using a scanning electron microscope (SEM) at a magnification of 20,000 times, and the photograph was attached as FIG. 1. It can be seen from FIG. 1 that the porous membrane according to the present example has a cross-sectional structure in which micro pores are oriented in multiple layers.

Figure 3:
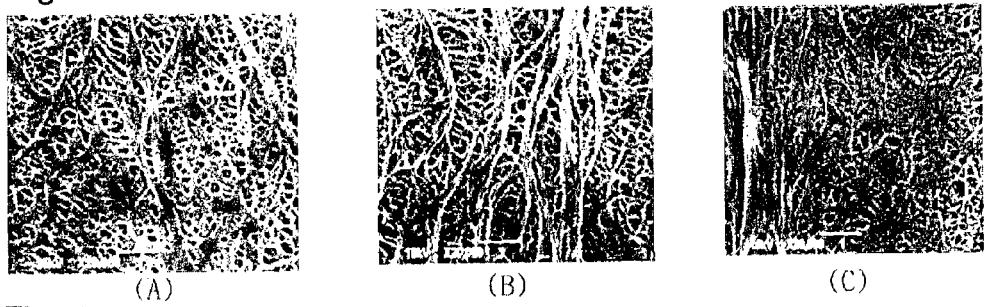
FIG. 3 is scanning electron microscope photographs of states of surfaces of skin layers (A and C) on opposite sides and a core layer (B) of a porous membrane according to another example of the present invention.

Also, photographs of states of upper and lower skin layers and a core layer of the porous membranes manufactured by Examples 1-1 and 1-2 above were taken using a SEM at a magnification of 20,000 times, the photographs were attached as FIGS. 2 and 3, respectively. As can be seen from FIGS. 2 and 3, the upper and lower skin layers of the porous membranes according to the present examples (photographs A and C) exhibit a high proportion of pores of relatively small sizes, and the core layers (photographs B) exhibit a high proportion of pores of relatively large sizes. Also, it can be seen that in the core layers (photographs B), as opposed to conventional porous membranes, thick fiber bundles like leaf veins are formed side by side.

[Physical Property Test]

The porous membranes manufactured in Examples 1-1, 1-2 and 1-3 and a separator [product by Foshan Jinhui High-Tech Photoelectric Material Co., Ltd., China], which is a commercially available conventional product, as a comparative example, were measured in terms of electric performance and mechanical properties, and the results were indicated in Table 1 below and compared.

TABLE 1

| Test item | | Example 1-1 | Example 1-2 | Example 1-3 | Comparative Example |
|---|---|---|---|---|---|
| Thickness (μm) | | 10.1 | 16.2 | 19.9 | 21.6 |
| Ion conductivity ($10^{-4}$ S/cm) | | 8.9 | 8.3 | 7.3 | 6.8 |
| Gurley value (sec/100 ml) | | 161.5 | 229.8 | 230.1 | 415.6 |
| Tensile strength (kgf/cm$^2$) | MD | 1948 | 2140 | 2102 | 977 |
| | TD | 2395 | 1564 | 1403 | 926 |
| Tensile elongation ratio (%) | MD | 82 | 51 | 62 | 156.8 |
| Puncture strength (Kgf) | | 529 | 698.2 | 697.5 | 408.9 |

As indicated in Table 1, the porous membranes manufactured by the examples of the present invention each exhibit an ion conductivity much higher than that of the conventional market-available product. For reference, the high ion conductivity contributes to an increase in charge/discharge efficiency and cycle of the secondary batteries, and as a result, the effect of enhancing the durability of the secondary batteries is provided.

Furthermore, it was confirmed that the porous membranes manufactured by the examples of the present invention each have a small thickness relative to that of the commercially-available product and the porous membranes thus each have an excellent Gurley value while generally having excellent mechanical properties, that is, e.g., tensile strength and puncture strength.

[Test Method]

Test methods for the test items in Table 1 are described below.

1) Ion conductivity ($10^{-4}$ S/cm): A porous membrane impregnated with an electrolyte between Ni metals of a same area is fixed and sealed by pouching and then subjected to ion conductivity measurement using an impedance measuring device.

2) Gurley value (sec/100 ml): Time taken for 100 ml of air to flow through a sample of a size of 30×30 mm is measured using an Gurley value measuring device manufactured by Toyo Seiki Seisaku-sho, Ltd.

3) Tensile strength (kgf/cm$^2$): A force imposed on a sample of a size of 20×200 mm until the sample is broken in the machine (MD) and the transverse (TD) directions using a tensile strength testing device manufactured by Instron Corporation is measured.

4) Tensile elongation ratio (%): A ratio of elongation of a sample of a size of 20×200 mm until the sample is broken in the machine (MD) direction using a tensile strength testing device manufactured by Instron Corporation is measured.

5) Puncture strength (kgf): A force imposed on a sample of a size of 100×50 mm by a stick until the stick penetrates the sample is measured using a puncture strength measuring device manufactured by Kato Tech Co., Ltd.

2. Examples of Second Porous Membranes

The present examples relate to porous membranes each including a porous base material that includes a polyethylene resin and is coated with ceramic slurry.

Example 2-1

2-1-1 Manufacture of Porous Base Material

For a pore-forming additive, 8.8 parts by weight of a solid-type paraffin wax having a weight-average molecular weight of 3,800 and 11 parts by weight of a liquid-type paraffin oil having a weight-average molecular weight of 500 were mixed and then melted and kneaded at 90° C. for one hour to prepare a paraffin wax mixture. Subsequently, 12.3 parts by weight of a polyethylene resin having a weight-average molecular weight of 380,000 and 1.0 parts by weight of phosphite ester as an antioxidant were added into the paraffin wax mixture to manufacture a raw material resin mixture.

The raw material resin mixture was put into an extrusion screw through an extruder hopper, and the melt was subjected to rolling through a T-die at a temperature of 200° C. with the rotation speed of the screw maintained at 400 rpm to form a gelatinous sheet having a thickness of 2,100 μm, and then the gelatinous sheet was cooled while being made to pass between a casting roll and a nip roll, respective surface temperature of which were maintained at 40° C. Here, the diameters of the casting roll and the nip roll have a ratio of 1.5:1.0, and for the nip roll, a nip roll including an inverse gradient of a radius of 1,900,000 mm was used.

The sheet was sequentially stretched in a machine direction by 10 times and then in a transverse direction by 10 times, and the stretched sheet was immersed in a methylene chloride solution to elute and remove the pore-forming additive. Lastly, the stretched sheet was thermally fixed over 4 minutes in a heat chamber having a temperature of 130° C. to manufacture a porous base material for a secondary battery porous membrane, which have a thickness of 12 μm.

2-1-2 Manufacture of Aqueous-Dispersion Ceramic Slurry

A carboxymethylcellulose salt was put into water at a concentration of 5%, and with 5 parts by weight of this polymer solution as a base, 100 parts by weight of water, 100 parts by weight of alumina (aluminum oxide) having a purity of 99.99% and an average grain size of 50 nm, 5 parts by weight of an acrylic-acrylonitrile copolymerized emulsion latex and 2 parts by weight of CMC having a viscosity modification function and a dispersion function were mixed in the polymer solution, and then the mixture was sufficiently mixed by ball milling to manufacture aqueous-dispersion ceramic slurry.

2-1-3 Formation of Ceramic Coating Layer

The ceramic slurry manufactured by the method in Example 2-1-2 above was applied to both of opposite surfaces of the porous base material manufactured by the method in Example 2-1-1 above: gravure coating was performed using a roll of 110 mesh and the resulting porous base material was dried at temperature of 80° C. in a hot-air oven for one hour to form a ceramic coating layer having a thickness of 2.5 μm thereon.

Example 2-2

Although a method that is the same as that of Example 2-1 above was used, a ceramic coating layer was applied so as to have a thickness of 3 μm to manufacture a ceramic-coated porous membrane.

Example 2-3

Although a method that is the same as that of Example 2-1 above was used, a ceramic coating layer was applied so as to have a thickness of 4 μm to manufacture a ceramic-coated porous membrane.

Example 2-4

Although a method that is the same as that of Example 2-1 above was used, during manufacture of ceramic slurry, instead of an acrylic-acrylonitrile copolymerized emulsion latex, a butadiene-styrene random copolymer emulsion latex was used as a particulate polymer to manufacture a ceramic-coated porous membrane.

Example 2-5

Although a method that is the same as Example 2-1 above was used, during manufacture of ceramic slurry, instead of a carboxymethylcellulose salt, an alkali-swellable acrylic resin was used as a water-soluble polymer to manufacture a ceramic-coated porous membrane.

Comparative Example 2-1

A porous thin-membrane base material having a thickness of 18 μm was manufactured by the method of Example 2-1-1 above and no ceramic coating was provided.

Comparative Example 2-2

A porous base material was manufactured by a conventionally known dry process. In other words, a melt of a high-density polyethylene resin and an antioxidant was subjected to rolling through a T-die at a temperature of 200° C. in a biaxial extruder with the rotation speed maintained at 400 rpm to manufacture a gelatinous sheet having a thickness of 300 μm. Here, for a casting roll, an ordinary one was used, and in order to form pores, the gelatinous sheet was uniaxially stretched in a machine direction by 9.0 times at 100° C. and thermally fixed for 3 minutes in a hot-air oven of 120° C. No ceramic coating was provided.

Comparative Example 2-3

Although a porous thin-membrane base material was manufactured by the method of Example 2-1-1, for a casting roll and a nip roll, those of ordinary shapes were used to manufacture a gelatinous sheet, and pore formation and sequential stretching processes were performed as in Example 1. No ceramic coating was provided.

Comparative Example 2-4

Although a porous base material was manufactured by a method that is the same as the method of Example 2-1-1, a polypropylene resin was not added as a raw material resin, and only a polyethylene resin was used. No ceramic coating was provided.

Comparative Example 2-5

A ceramic-coated porous membrane was manufactured by a method that is the same as the method of Example 2-1-1. However, a ceramic coating solution including 7% by weight of polymetaphenylene isophthalamide, 4.5% by weight of calcium chloride, 86% by weight of N-methyl-2-pyrrolidone (NMP) and 2.5% by weight of a dispersant was applied to both of opposite surfaces of a porous base material, and immersed in a constant-temperature bath including 60% by weight of N-methyl-2-pyrrolidone (NMP) and 40% by weight of water for 10 minutes and then rinsed by water and dried at a temperature of 60° C. for one hour in a hot-air oven to form a ceramic coating layer.

Comparative Example 2-6

A ceramic-coated porous membrane was manufactured by a method that is the same as the method of Example 2-1-1. However, a solution including 1% by weight of polyvinylidene fluoride (PVDF) and 99% by weight of N-methyl-2-pyrrolidone (NMP) was manufactured and then a ceramic coating solution with 20% by weight of alumina dispersed in 80% by weight of the solution was manufactured, and the coating solution was applied to both of opposite surfaces of a polyethylene porous base material, which was then dried at a temperature of 60° C. for one hour in a hot-air oven to manufacture a ceramic coating layer.

[Physical Property Evaluation]

Physical properties of the porous membranes manufactured according to the examples and the comparative example were measured, and the results are indicated in Tables 2 and 3.

TABLE 2

| | | | Example | | | | |
|---|---|---|---|---|---|---|---|
| | Category | | 2-1 | 2-2 | 2-3 | 2-4 | 2-5 |
| Thickness | Porous base material (μm) | | 12 | 12 | 12 | 12 | 12 |
| | Double-side coating thickness (μm) | | 5 | 6 | 8 | 6 | 6 |
| Pores | Gurley value (sec/100 ml) | | 166 | 178 | 184 | 196 | 193 |
| | Porosity (%) | | 49 | 45 | 43 | 46 | 43 |

TABLE 2-continued

|  | Category |  | Example 2-1 | Example 2-2 | Example 2-3 | Example 2-4 | Example 2-5 |
|---|---|---|---|---|---|---|---|
| Mechanical properties | Tensile strength (kgf) | MD | 1407 | 1358 | 1391 | 1365 | 1374 |
|  |  | TD | 1329 | 1314 | 1330 | 1315 | 1347 |
|  | Tensile elongation ratio (%) | MD | 39.2 | 34.8 | 35.6 | 35 | 35.3 |
|  |  | TD | 80.7 | 78.8 | 82.3 | 82.6 | 81.7 |
|  | Puncture strength (gf) |  | 362 | 423 | 433 | 428 | 436 |
| Thermal contractility (%) | 105° C. 1 hr | MD | 0.2 | 0 | 0 | 0 | 0 |
|  |  | TD | 0 | 0 | 0 | 0 | 0 |
|  | 150° C. 1 hr | MD | 1.0 | 0.5 | 0.4 | 0.5 | 0.5 |
|  |  | TD | 2.0 | 0.8 | 0.8 | 1.0 | 1.0 |

TABLE 3

|  | Category |  | Comparative Example 2-1 | 2-2 | 2-3 | 2-4 | 2-5 | 2-6 |
|---|---|---|---|---|---|---|---|---|
| Thickness | Porous base material (μm) |  | 18 | 26 | 12 | 18 | 12 | 12 |
|  | Double-side coating thickness (μm) |  | — | — | — | — | 6 | 6 |
| Pores | Gurley value (sec/100 ml) |  | 145 | 416 | 168 | 158 | 523 | 321 |
|  | Porosity (%) |  | 48 | 36 | 46 | 47 | 18 | 35 |
| Mechanical properties | Tensile strength (kgf) | MD | 1453 | 1015 | 1156 | 1232 | 1453 | 1420 |
|  |  | TD | 1357 | 148.5 | 1063 | 1105 | 1359 | 1336 |
|  | Tensile elongation ratio (%) | MD | 54.2 | 52 | 32 | 39.5 | 39.7 | 39.4 |
|  |  | TD | 70.1 | 72 | 30 | 69.8 | 81.1 | 80.9 |
|  | Puncture strength (gf) |  | 420.4 | 322 | 302 | 349 | 375 | 365 |
| Thermal contractility (%) | 105° C. 1 hr | MD | 6.8 | 2.5 | 0.5 | 10.5 | 0.3 | 0.5 |
|  |  | TD | 4.5 | 0 | 0 | 8.5 | 0 | 0 |
|  | 150° C. 1 hr | MD | 70 | 35.5 | 74 | 75 | 78 | 76 |
|  |  | TD | 80 | −2 | 73.5 | 85 | 83 | 86 |

[Test Method]

Test methods for test items in Tables 2 and 3 are described below.

1) Thermal contractility (%): A sample of a size in machine and transverse directions of 10×10 cm was prepared using each of the porous membranes manufactured according to the examples and the comparative example, and the sample was sandwiched by A4 sheets of paper and put in an oven and left for one hour at each of temperatures 105° C. and 150° C., and the respective contractilities were measured.

2) Gurley value (sec/100 ml): A sample of a size of 30×30 mm was taken from each porous membrane and time required for 100 ml of air to flow through the sample was measured using a Gurley value measuring device manufactured by Toyo Seiki Seisaku-sho, Ltd.

3) Tensile strength (kgf): A sample of a size in the machine and transverse directions of 20×200 mm was taken from each porous membrane, and a force imposed on the sample until the sample was broken was measured using a tensile strength testing device manufactured by Instron Corporation.

4) Tensile elongation ratio (%): A sample of a size in the machine and transverse directions of 20×200 mm was taken from each porous membrane, and a ratio of elongation of the sample until the sample was broken was measured using a tensile strength testing device manufactured by Instron Corporation.

5) Puncture strength (gf): A sample of 100×50 mm was taken from each porous membrane, and a force imposed on the sample using a stick until the sample was punctured was measured using a puncture strength measuring device manufactured by Kato Tech Co., Ltd.

First, as indicated in examples 2-1, 2-2 and 2-3, the results show that when the porous base materials have a same thickness, as the thickness of the coating layer is larger, the air permeability is gradually lowered. Then, as indicated in Tables 2 and 3, ceramic-coated porous membranes manufactured according to the examples of the present invention exhibit remarkably enhanced thermal stability compared to those of the comparative examples.

Also, in the case of comparative Example 2-2 in which only a polyethylene resin was used as a raw material resin for a porous thin-membrane base material, the mechanical properties such as tensile strength were much poorer than those of the examples and the other comparative examples in which polypropylene was added although the base material have a larger thickness compared to those of the examples and the other comparative examples.

In particular, in the case of comparative examples 2-5 and 2-6 in which a coating layer was formed using a conventional organic/inorganic coating solution, the results show that a numerical value representing the Gurley value was increased by substantially twice to third times compared to that of comparative Example 2-3 in which no ceramic coating layer was applied and the thickness of the base material was the same as that of comparative examples 2-5 and 2-6, resulting in a large decrease in air permeability, while the examples using aqueous ceramic slurry according to the present invention exhibit a relatively much smaller degree of decrease in air.

Also, in the case of Example 2-5 in which a water-soluble polymer and a particulate polymer of types that are different from those of Example 2-1 were used, the results show that the numerical value representing the Gurley value was somewhat higher than that of Example 2-1, and consequently, the water-soluble polymer resin used in Example 2-1 turned out to be more suitable.

Figure 7:
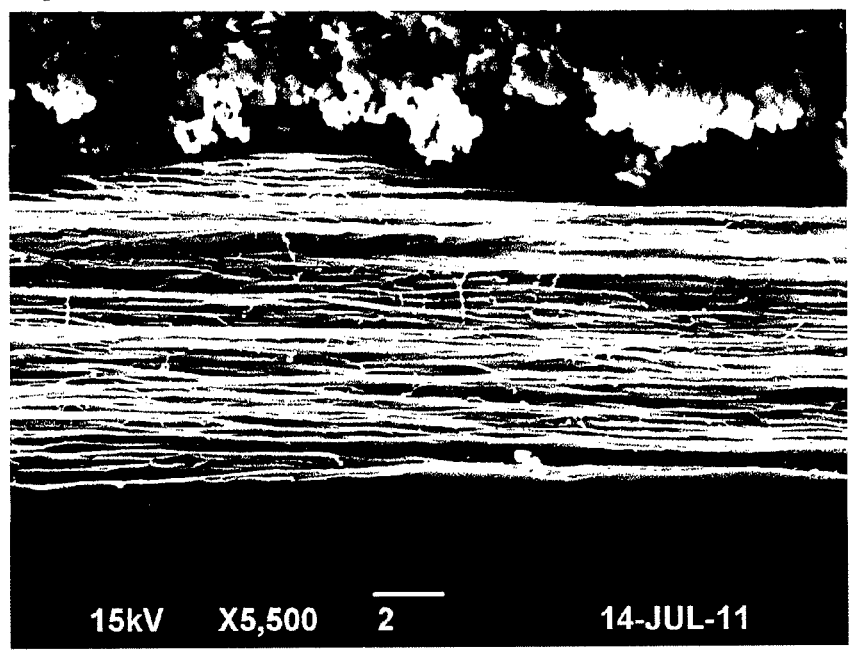
FIG. 7 is a scanning electron microscope photograph taken of a cross-sectional structure of a ceramic-coated porous membrane according to the present invention at a magnification of 5500 times.

FIG. 7 is a scanning electron microscope photograph taken of a cross-sectional structure of a ceramic-coated porous membrane manufactured according to Example 2-1 above at a magnification of 5,500 times: it can be seen that a multilayer structure in which fibers of a base material are piled up in layers and among the fibers, micro pores are oriented in multiple layers, and on a surface (upper surface structure in FIG. 7) thereof, a porous ceramic coating layer is formed.

3. Examples of Third Porous Membrane

Figure 4:
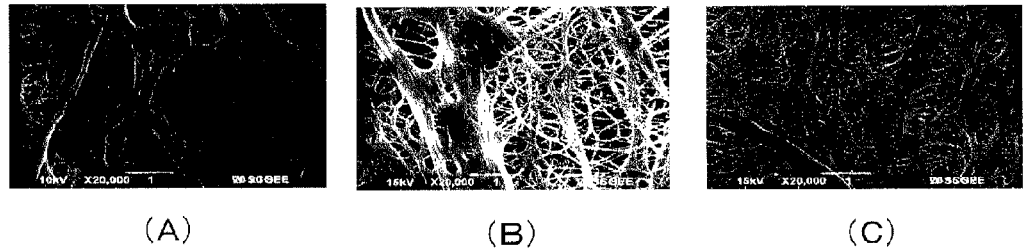
FIG. 4 is scanning electron microscope photographs of states of surfaces of skin layers (A and C) on opposite sides and a core layer (B) of a porous membrane according to another example of the present invention.
Figure 5:
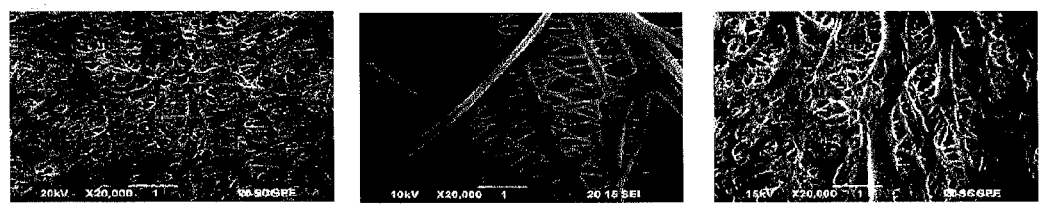
FIG. 5 is scanning electron microscope photographs of states of surfaces of skin layers (A and C) on opposite sides and a core layer (B) of a porous membrane according to another example of the present invention.

The porous membranes illustrated in FIGS. 4 and 5 are ones manufactured by a method that is basically the same as that of the first examples, but different from the first Examples in that a solid-type paraffin having a weight-average molecular weight of 100 to 1,000 was used. In each of the porous membranes according to the present examples, it can be seen that the upper and lower skin layers (photographs A and C) exhibit a high distribution proportion of pores of relatively small sizes and the core layer (photograph B) exhibits a high distribution proportion of pores of relatively large sizes. Also, it can be seen that in the core layer (photograph B), as opposed to conventional porous membranes, thick fiber bundles like left veins are formed side by side.

Each of the porous membranes according to the present Examples was placed in an oven with a temperature increased by 5° C. per minute from room temperature to 200° C. and left in an atmosphere of 200° C. for one hour. Subsequently, the porous membrane was checked and it was confirmed that the porous membrane was not broken.

INDUSTRIAL APPLICABILITY

The present invention is applicable to separators for, e.g., lithium-ion batteries.

The invention claimed is:

1. A porous membrane including a polyethylene resin, fibers of the polyethylene resin being piled up in multiple layers, in which the polyethylene resin contains micro pores formed so as to extend in a horizontal direction,
   wherein the polyethylene resin is formed by adding a mixture of a solid-type paraffin wax and a liquid-type paraffin oil in a gelatinous state as a pore-forming additive;
   wherein an average diameter ($\alpha 1$) of the micro pores at a horizontal surface of a core layer is larger than an average diameter ($\beta 1$) of the micro pores at a horizontal surface of each of skin layers on opposite sides; and
   wherein the skin layers have a substantially same pore characteristic.

2. The porous membrane according to claim 1, wherein a ratio ($\alpha 1$)/($\beta 1$) of the average diameter ($\alpha 1$) to the average diameter ($\beta 1$) is no less than 1.5.

3. The porous membrane according to claim 1, wherein the porous membrane has a structure in which the respective micro pores extend in the horizontal direction and are oriented in multiple layers among porous base material fibers, and the porous membrane includes pores of sizes of 0.01 to 0.3 μm at a distribution proportion of 50 to 97% in the entire pores of a skin layer on each of opposite sides, and pores of sizes of 0.3 to 1 μm at a distribution proportion of 50 to 97% in the entire pores of the core layer.

4. The porous membrane according to any of claim 1, wherein slurry containing an inorganic filler or an organic filler and an organic binder is applied to one surface or both of opposite surfaces of the porous membrane.

5. The porous membrane according to claim 4, wherein the slurry contains 0.1 to 30% by weight of a water-soluble polymer, 1 to 40% by weight of a non-water-soluble particulate polymer manufactured by emulsion polymerization or suspension polymerization, 1 to 50% by weight of the inorganic filler and 20 to 70% by weight of water.

6. The porous membrane according to claim 5, wherein the water-soluble polymer is any one or more selected from methylcellulose, carboxymethylcellulose and salts thereof, and associative polyurethane and alkali-swellable acrylic resins.

7. The porous membrane according to claim 5, wherein the particulate polymer is any one or more selected from an acrylic copolymer, a methacrylic copolymer, a (meth)acrylic-styrene copolymer, a (meth)acrylic-acrylonitrile copolymer, a silicon-acrylic copolymer, an epoxy-acrylic copolymer, polybutadiene, polyisoprene, a butadiene-styrene random copolymer, an isoprene-styrene random copolymer, an acrylonitrile-butadiene copolymer, an acrylonitrile-butadiene-styrene copolymer, a butadiene-styrene block copolymer and a styrene-butadiene-styrene-block copolymer.

8. The porous membrane according to claim 5, wherein the particulate polymer has a particle size of 0.01 to 1 μm.

9. The porous membrane according to claim 4, wherein the inorganic filler is any one or more selected from $CaCO_3$, $Al_2O_3$, $SiO_2$, $BaTiO_3$, $TiO_2$, Talc, $Al(OH)_3$ and AlOOH and having a diameter of 0.1 to 2 μm.

10. The porous membrane according to claim 4, wherein the porous membrane has a thickness of 10 to 30 μm, a porosity of 30 to 50%, a Gurley value of 100 to 400 sec/100 ml, a tensile strength of 1,000 to 3.000 kgf/cm$^2$, and a thermal contractility of less than 5% in each of a machine direction and a transverse direction upon exposure at 150° C. for one hour.

* * * * *

UNITED STATES PATENT AND TRADEMARK OFFICE
CERTIFICATE OF CORRECTION

| | | |
|---|---|---|
| PATENT NO. | : 9,293,750 B2 | Page 1 of 1 |
| APPLICATION NO. | : 13/646162 | |
| DATED | : March 22, 2016 | |
| INVENTOR(S) | : Yang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 608 days.

Signed and Sealed this
Twenty-first Day of June, 2016

Michelle K. Lee
*Director of the United States Patent and Trademark Office*